United States Patent [19]

Steinmann et al.

[11] Patent Number: 4,814,301
[45] Date of Patent: Mar. 21, 1989

[54] POLYCRYSTALLINE SINTERED ARTICLES BASED ON SILICON NITRIDE AND SINTERING ADDITIVES

[75] Inventors: Detlef Steinmann, Rodental; Alfred Lipp, Bad Worishofen, both of Fed. Rep. of Germany

[73] Assignee: Elektroschmelzwerk Kempten GmbH, Munich, Fed. Rep. of Germany

[21] Appl. No.: 135,580

[22] Filed: Dec. 21, 1987

Related U.S. Application Data

[63] Continuation of Ser. No. 740,001, May 31, 1985, abandoned.

[30] Foreign Application Priority Data

Jun. 27, 1984 [DE] Fed. Rep. of Germany ....... 3423573

[51] Int. Cl.$^4$ .............................................. C04B 35/58
[52] U.S. Cl. ....................... 501/92; 501/97; 501/98
[58] Field of Search ............. 501/96, 97, 98, 87, 501/92; 264/65

[56] References Cited

U.S. PATENT DOCUMENTS

| | | | |
|---|---|---|---|
| 3,541,589 | 11/1970 | Lubatti et al. | 501/97 |
| 3,836,374 | 9/1974 | Richerson et al. | 501/97 |
| 3,950,464 | 4/1976 | Masaki . | |
| 4,004,937 | 1/1977 | Masaki . | |
| 4,046,580 | 9/1977 | Ishii et al. . | |
| 4,069,059 | 1/1978 | McDonough et al. | 501/97 |
| 4,102,698 | 7/1978 | Lange et al. . | |
| 4,179,301 | 12/1979 | Buljan . | |
| 4,180,410 | 12/1979 | Masaki . | |
| 4,234,343 | 11/1980 | Andersson . | |
| 4,280,850 | 7/1981 | Smith et al. | 501/97 |
| 4,388,085 | 6/1983 | Sarin et al. | 501/97 |
| 4,401,617 | 8/1983 | Ezis et al. | 501/98 |

FOREIGN PATENT DOCUMENTS

| | | | |
|---|---|---|---|
| 0009859 | 4/1980 | European Pat. Off. . | |
| 045518 | 3/1982 | European Pat. Off. . | |
| 2302438 | 7/1973 | Fed. Rep. of Germany | 501/97 |
| 2800174 | 7/1979 | Fed. Rep. of Germany . | |
| 40-25062 | 11/1965 | Japan | 501/98 |
| 52-9686 | 3/1977 | Japan | 501/87 |
| 60-27648 | 2/1985 | Japan | 501/98 |
| 60-51661 | 3/1985 | Japan | 501/87 |
| 983567 | 2/1965 | United Kingdom | 501/98 |

*Primary Examiner*—William R. Dixon, Jr.
*Assistant Examiner*—Ann M. Knab
*Attorney, Agent, or Firm*—Burgess, Ryan & Wayne

[57] ABSTRACT

The invention relates to polycrystalline sintered articles comprising at least 50% by weight of crystalline silicon nitride phase of which at least 90% by weight is in the $\beta$-form, and at least one secondary crystalline intergranular silicate phase, and having a density of at least 99% of the theoretically possible density, a modulus of elasticity at room temperature of less than 300 kN/mm$^2$, a short-term bending strength at room temperatue, measured according to the 4-point method, of at least 600 N/mm$^2$ which, up to 1200° C., decreases by less than 50%, and a long-term bending strength, measured according to the 4-point method, which is characterized by a numerical value of more than 40 at 1200° C. for the crack growth resistance parameter n.

These polycrystalline sintered articles are manufactured, by sintering with or without the use of pressure, a mixture of silicon nitride powder, crystalline silicates of natural or synthetic origin having melting points in the range of from 1350° C. to 1950° C. as sintering additives and metal carbides having melting points at least from 1500° C. as nucleus formers.

11 Claims, No Drawings

POLYCRYSTALLINE SINTERED ARTICLES BASED ON SILICON NITRIDE AND SINTERING ADDITIVES

This application is a continuation of application Ser. No. 740,001, filed May 31, 1985, now abandoned.

BACKGROUND OF THE INVENTION

Dense sintered articles comprising polycrystalline silicon nitride which have been produced with the concomitant use of sintering additives based on oxides are known. These articles have high strength at room temperature, high resistance to fracture, low thermal expansion and very good resistance to wear. These sintered articles are manufactured from silicon nitride powders, with sintering additives, according to known sintering processes with and without the use of pressure. As sintering additives, those based on oxides such as magnesium oxide, yttrium oxide and other oxides of rare earths are especially useful. They are used individually or as mixtures or in the form of pre-sintered mixed oxides of the spinel type. Depending on the type and amount of sintering additives and the particular sintering process used, dense sintered articles can be obtained. These articles generally have good or very good bending strengths at room temperature (Cf. U.S. Pat. No. 3,950,464, U.S. Pat. No. 4,004,937 and U.S. Pat. No. 4,180,410, which corresponds to DE-C No. 28 20 694).

It is also known, that sintered articles based on silicon nitride manufactured using these known oxides or mixed oxides as sintering additives generally have poor resistance to high temperature. Their bending strength at about 1300° C. is less than 50% of the value measured at room temperature. This decrease in bending strength has been attributed to the presence of non-crystalline, glass-like phases, at the grain boundaries.

Since poor physical properties at high temperatures severely restrict the use of the sintered articles as components which are subject to stress at high temperatures, numerous proposals have been made to prevent the formation of these undesirable intergranular glass-like phases to or subsequently convert these glass-like phases into crystalline phases.

For example, it is known that the formation of crystalline phases comprising $Si_3N_4 \cdot nY_2O_3$, in which n represents 1, 2 and/or 3, can be obtained by sintering precompressed articles comprising silicon nitride and yttrium oxide powder in the presence of aluminum nitride, with and/or without the use of pressure, at temperatures of from 1650° to 1800° C. The purity of the silicon nitride starting powder used was not critical in this instance, that is, small amounts of impurities such as iron, aluminum or calcium, can be tolerated. The amounts of yttrium oxide added should, however, preferably be less than 5 percent by weight (cf. U.S. Pat. No. 4,046,580, which corresponds substantially to DE-B No. 25 28 869).

Another method was disclosed in U.S. Pat. No. 4,102,698, in which silicon nitride, yttrium oxide and silicon dioxide powder mixtures of a specific composition were sintered with the use of pressure. The amounts of the materials used corresponded to a specific area in the ternary system $Si_3N_4-Y_2O_3-SiO_2$, to exclude the possibility of the formation of unstable compounds. The data shows a considerable decrease in the bending strength between room temperature and 1400° C.

A further improvement in high temperature properties was disclosed as being obtained by using very pure powder mixtures of specific composition in amounts which corresponded to a specific area in the ternary system $Si_3N_4-SiO_2-M_2O_3$, wherein M comprises at least two different components each of which have an ionic radius of less than 0.89 A. The sintered articles are prepared by hot pressing or isostatic hot pressing mixtures of the individual oxides, together with $Si_3N_4$ powder. The oxides can, also be melted to form a pyrosilicate which is then mixed with the $Si_3N_4$ powder before the hot-pressing operation (cf. U.S. Pat. No. 4,234,343).

In order to facilitate the formation of a crystalline phase instead of the undesired glass-like intergranular phases, it is known to concomitantly use small amounts of nucleus formers such as iron and titanium, in elementary form or in the form of oxides and nitrides (cf. U.S. Pat. No. 4,179,301), or tungsten carbide, titanium carbide and aluminum oxide, which can be introduced in the form of abraded material from grinding during the manufacture of the homogeneous powder mixture (cf. U.S. Pat. No. 4,401,617 and EP-A No. 9859). The introduction of the sintering additives in the form of abraded material from grinding using grinding bodies comprising an oxide or a silicate is also known (cf. DE-A No. 28 00 174).

In addition, attempts have been made to use instead of yttrium oxide, which is generally regarded as one of the most effective sintering additives, a high-melting zirconium compound, zirconium silicate (cf. U.S. Pat. No. 4,069,059). In addition, it is said that the physical properties of sintered articles comprising silicon nitride can be improved by the concomitant use of lithium oxide or aluminium oxide and iron oxide as sintering additives in addition to yttrium oxide. Attention is drawn to the fact that by the specific addition of these constituents, drastic deterioration of long-term and short-term properties, due to oxidation, can be avoided, both at room temperature and at high temperatures; (cf. EP-A No. 45518).

It is clear from the extensive prior art that the formation of secondary crystalline intergranular phases instead of glass-like phases, is necessary to obtain good high-temperature properties during the sintering of silicon nitride. The prior art teaches that specific measures such as heat treatment in the presence of aluminium nitride, a limited choice in regard to the type and amount of sintering additives used, the use of very pure silicon nitride starting powders or the concomitant use of nucleus formers or other substances is necessary to obtain good high temperature properties. Apart from the fact that some of the individual measures are expensive, they do not guarantee that the finished sintered articles based on silicon nitride will have the following combination of properties:

(1) high density,
(2) high mechanical strength at room temperature and a small decrease in strength with temperature and
(3) a long life that is, a slow decrease in strength with time.

The problem is to provide polycrystalline sintered articles based on silicon nitride and sintering additives which have this combination of properties.

BRIEF DESCRIPTION OF THE INVENTION

According to the invention, the problem is solved by means of polycrystalline sintered articles comprising at least 50 percent by weight of a crystalline silicon nitride phase of which at least 90 percent by weight is the β-form and at least one secondary crystalline intergranular silicate phase, the article having a density of at least 99% of the theoretically possible density, a modulus of elasticity at room temperature of <300 kN/mm2, a short-term bending strength at room temperature, measured according to the 4-point method, of at least 600 N/mm$^2$ which, up to 1200° C., decreases by less than 50%, and a long-term bending strength, measured according to the 4-point method, which is characterized by a numerical value of >40 at 1200° C. for the crack growth resistance parameter n.

The polycrystalline sintered articles according to the invention can be manufactured by sintering, with or without the use of pressure, of silicon nitride powders, sintering additives and nucleus formers by using as sintering additives crystalline silicates of natural or synthetic origin having melting points in the range of from 1350° to 1950° C. and as nucleus formers metal carbides having melting points of at least 1500° C.

DETAILED DESCRIPTION OF THE INVENTION

The starting materials are preferably homogeneous powder mixtures comprising at least 50 percent by weight of silicon nitride, of which at least 80 percent by weight is in the α-form, containing not more than 4.0 percent by weight of impurities in the form of oxides and free carbon, and having a specific surface area of from 3 to 15 m$^2$/g (measured according to BET), not more than 49.5 percent by weight of crystalline silicates and at least 0.5 percent by weight of carbide nucleus formers having an average particle size of <2 μm.

The preferred crystalline silicates have melting points in the range of from 1400° to 1900° C., and are members of the group consisting of the neso, soro, cyclo, ino, phyllo and tecto silicates, with the exception of quartz.

Examples of useful crystalline silicates of natural origin are

Ca/Mg silicates, such as $CaMg(Si_2O_6)$ (diopside), $Ca_2Mg(Si_2O_7)$ (akermanite), Mg silicates, such as $Mg_2(SiO_4)$ (forsterite), $Mg_3(Si_4O_{10})(OH)_2$ (talc)

Mg/Fe silicates, such as $(Mg,Fe)_2(SiO_4)$ (olivine),

K/Al silicates, such as $KAl_2(OH,F)_2/AlSi_3O_{10})$ (muscovite),

Al silicates, such as $Al_2((OH)_2/Si_4O_{10})$ (pyrophyllite),

Na/Al silicates, such as $Na_2Al_2(Si_2O_8)$ (nephelite), and

Al/Be silicates, such as $Al_2Be_3(Si_6O_{18})$ (beryl).

Examples of useful crystalline silicates of synthetic origin are

Ca/Al silicates, such as $CaAl_2(Si_2O_8)$, manufactures from $CaO \times Al_2O_3 \times 2SiO_2$, and Y/N silicates, such as $Y_4N_2(Si_2O_7)$ or $YAlN(SiO_5)$, manufactured from $Si_2ON_2 \times 2Y_2O_3$ or from $AlN \times SiO_2 \times Y_2O_3$.

The preferred metal carbides having melting points within the defined range are those comprising metal atoms from groups 4b, 5b and 6b of the Periodic Table, and also boron and silicon.

Examples of useful carbides are TiC, ZrC, WC, TaC, CrC, VC, $B_4C$ and SiC.

It is critical that the nucleus formers should not melt at the sintering temperatures used and should not react with the crystalline silicates, or with the silicon nitride or the impurities (for example Fe) contained therein. The average starting size of the particles of the nucleus formers is, according to the definition, <2 μm, preferably <1 μm, with maximum particle sizes of up to approximately 10 μm.

The sintered articles of the invention can be manufactured using silicon nitride powders of customary fineness and purity that is, neither very fine nor very pure powders are necessary. Commercially available powders containing at least 80 percent by weight of $Si_3N_4$ in the α-form and containing not more than 4.0 percent by weight of impurities in the form of oxides and free carbon are useful powders having a maximum particle size of up to about 15 μm, that is having a specific surface area in the range of about 3 to 15 m$^2$/g (measured according to BET), can be used. The amounts of impurities that can be tolerated are, approximately:

$CaO \leqq 0.4\%$ by weight
$MgO \leqq 0.2$ by weight
$Na_2O \leqq 0.1$ by weight
$K_2O \leqq 0.1$ by weight
$Li_2O \leqq 0.1$ by weight
$Al_2O_3 \leqq 1.1$ by weight
$Fe_2O_3 \leqq 1.5$ by weight
$TiO_2 \leqq 0.1$ by weight and
$C_{free} \leqq 0.4$ by weight A homogeneous mixture of the silicon nitride powders with the selected crystalline silicates and the nucleus formers can be formed by known means. For the formation of the secondary crystalline intergranular silicate phases in the finished sintered article, no limitation of the amount of crystalline silicates added as sintering additives is necessary, that is, in the homogeneous starting powder mixture, the content of crystalline silicates can be up to 49.5 percent by weight and the content of nucleus formers is at least 0.5 percent by weight, based on the total weight of the mixture. Preferably, from 5 to 40 percent by weight of crystalline silicates and from 2 to 15 percent by weight of nucleus formers are used. Titanium carbide is especially preferred as a nucleus former.

The homogeneous mixing is preferably effected by means of grinding in the presence of an organic solvent such as methanol, toluene or cyclohexane. Instead of the finished starting powder, the silicates and the nucleus formers can, also be mixed with silicon powder, and then nitrided. This results in especially uniform distribution of the sintering additives and nucleus formers in the silicon nitride.

The homogeneous starting powder mixtures are then sintered according to known processes with or without the use of pressure. The process parameters, such as temperature, dwell time and pressure, which are selected, are preferably adequate not only for a high degree of compression of the article to be sintered, but at the same time for virtually complete conversion of the α-form of the silicon nitride into the β-form.

The following process parameters have shown to be useful for the individual sintering processes:

1. Sintering without the use of pressure in a powder bed comprising silicon nitride or silicon nitride and boron nitride; maximum temperature 1900° C.; dwell time, depending on the wall thickness of the article to be sintered: from 10 to 40 mm: from 1 to 6 hours.

2. Sintering under a nitrogen pressure of at least 2 MPa; maximum temperature 2150° C.; dwell time for wall thicknesses of from 10 to 40 mm: from 1 to 3 hours.

3. Hot pressing under die pressure in the presence of nitrogen under normal pressure or in vacuo; maximum temperature 1850° C.; dwell time for a wall thickness of from 10 to 40 mm: from 1 to 1.5 hours.

4. Hot isostatic pressing under a nitrogen pressure of up to 200 MPa; maximum temperature 1900° C., dwell time for a wall thickness of from 10 to 40 mm: from 1 to 1.5 hours.

Irrespective of the individual sintering processes used, the polycrystalline sintered articles manufactured according to the invention using crystalline silicates and nucleus formers have a density of >99% of the theoretically possible density and a modulus of elasticity of <300 kN/mm$^2$, which is a measure of very good thermal shock resistance. The articles have high mechanical strength at room temperature and undergo only a slight decrease in strength with an increase in temperature demonstrated by a short-term bending strength at room temperature of at least 600 N/mm$^2$, measured according to the 4-point method, which, up to 1200° C., decreases by less than 50%, preferably by less than 40%, and is also characterized by a long life, as shown by only a slight decrease in strength with time, measured according to the 4-point method, which is characterised by the value of >40 at 1200° C. for the crack growth resistance parameter n.

The decrease in strength with time was determined by endurance tests and the 4-point stress test, in each case at a predetermined temperature. From these data the crack growth resistance parameter n was calculated.

This crack growth resistance parameter n is a measure of the slow crack growth and/or the static fatigue of the material under continuous stress at the particular temperatures used. Values for n especially at high temperatures of greater than 40 at 1200° C. means that the strength at the high temperature decreases only slowly with time as a result of creep processes (time-dependent, permanent plastic deformation) and slow crack growth (time-dependent crack growth).

The polycrystalline silicon nitride sintered articles manufactured according to the invention using crystalline silicates and nucleus formers are clearly superior, especially as regards their long-term strength, to those manufactured according to the prior art using one or more oxides; this was demonstrated by means of comparative tests.

In the following Examples, polycrystalline sintered articles were manufactured by sintering processes 1 to 4 using crystalline silicates and nucleus formers according to the invention. For comparison the properties of articles prepared using various oxides were investigated.

EXAMPLES

Silicon nitride starting powders having the following analysis were used:

|   | Powder A % by weight | Powder B % by weight |
| --- | --- | --- |
| α - Si$_3$N$_4$ | 87 | 80 |
| β - Si$_3$N$_4$ | 2.5 | 3 |
| O$_2$ | 1.63 | 2.01 |
| C | 0.21 | 0.39 |
| Al | 0.15 | 0.85 |
| Fe | 0.21 | 1.37 |
| Ca | 0.14 | 0.34 |
| Mg | ≦0.05 | ≦0.05 |
| Zr | ≦0.05 | ≦0.05 |
| Ti | 0.02 | 0.04 |
| Na | ≦0.02 | ≦0.03 |
| K | ≦0.02 | ≦0.02 |
| N$_2$ | 36.05 | 33.25 |

The silicon nitride powders were mixed homogeneously with the sintering additives and the nucleus formers in the amounts shown in the examples and sintered under the conditions given in each case. The specific surface area according to BET relates to the homogeneous powder mixture. All indications of percentage are by weight, unless otherwise indicated.

EXAMPLE 1

Powder A+10% Mg(Si$_2$O$_6$)+1% Cr$_3$C$_2$
Specific surface area: 3.7 m$^2$/g;
Hot pressing at 1800° C./24.5 MPa/dwell time: 1.5 hours.

EXAMPLE 2

Powder A+5% CaAl(Si$_2$O$_8$)+15% TiC
Specific surface area: 4.1 m$^2$/g;
Hot isostatic pressing at 1750° C./200 MPa/dwell time: 1 hour.

EXAMPLE 3

Powder A+5% Ca$_2$Mg(Si$_2$O$_7$)+3% WC
Specific surface area: 10.5 m$^2$/g;
Hot pressing at 1850° C./25 MPa/dwell time: 1 hour.

EXAMPLE 4

Powder A+10% Na$_2$Al$_2$(Si$_2$O$_8$)+0.5% TiC
Specific surface area: 14.3 m$^2$/g;
Sintering in a powder bed at 1920° C./N$_2$ stream/dwell time: 6 hours.

EXAMPLE 5

Powder B+5% (Mg,Fe)$_2$(SiO$_4$)+0.5% B$_4$C
Specific surface area: 9.8 m$^2$/g;
Hot pressing at 1700° C./25 MPa/dwell time: 1 hour.

EXAMPLE 6

Powder B+20% Al$_2$Be$_3$(Si$_6$O$_{18}$)+1% SiC
Specific surface area: 12.0 m$^2$/g;
Sintering at 2150° C. 10 MPa N$_2$ pressure/dwell time: 1.5 hours.

EXAMPLE 7 powder B+12% Y$_2$ALN(SIO$_5$)+0.5% VC
Specific surface area: 7.5 m$^2$/g;
Hot isostatic pressing at 1900° C./200 MPa/dwell time: 1 hour

EXAMPLE 8

Powder B+40% Y$_4$N$_2$(Si$_2$O$_7$)+1% TaC
Specific surface area: 14.4 m$^2$/g;
Sintering in a powder bed at 1870°/N$_2$ stream/dwell time: 6 hours

EXAMPLE 9

Powder A+5% (Mg,Fe)$_2$(SiO$_4$)+2% by weight TiC
Specific surface area: 10 m$^2$/g;
Hot pressing at 1700° C./25 MPa/dwell time: 1 hour

EXAMPLE 10

Example A+5% Mg$_3$(Si$_4$O$_{10}$)(OH)$_2$+15% by weight TiC
Specific surface area: 12 m$^2$/g;
Hot pressing at 1850° C./25 MPa/dwell time: 1 hour.

COMPARISON EXAMPLES

C1

Powder A+5% MgO

Specific surface area: 8 m²/g
Hot pressing at 1800° C./35 MPa/dwell time: 1 hour.

C2

Powder A+2% MgO+0.5% ZrO₂
Specific surface area: 12 m²/g
Hot pressing at 1750° C./30 MPa/dwell time: 1 hour.

C3

Powder A+4.5% MgO+0.5% ZrO₂
Specific surface area: 10 m²/g
Hot pressing at 1750° C./35 MPa/dwell time: 1.5 hours.

C4

Powder A+2% MgO+0.4% CaO+0.5% ZrO₂
Specific surface area: 11 m²/g
Hot pressing at 1800° C./35 MPa/dwell time: 1 hour.

C5

Powder A+11% Y₂O₃
Specific surface area: 8.5 m²/g
Hot pressing at 1800° C./35 MPa/dwell time: 1 hour.

C6

Powder A+8% Y₂O₃+2% Al₂O₃
Specific surface area: 23 m²/g
Sintering in a powder bed at 1780° C./0.1 MPa N₂/dwell time: 6 hours.

C7

Powder A+8% Y₂O₃+2% Al₂O₃
Specific surface area: 25 m²/g
Sintering at 1800° C./5 MPa N₂ pressure/dwell time: 5 hours.

C8

Powder A+8% Y₂O₃+2% Al₂O₃
Specific surface area: 23 m²/g
Hot isostatic pressing at 1800° C./200 MPa/dwell time: 2 hours

C9

Powder B+2.5% MgO
Specific surface area: 12 m²/g
Hot pressing at 1750° C./30 MPa/dwell time: 1 hour.

C10

Powder A+5% (CaO+MgO+SiO₂) in a molar ratio of 2:1:2
Specific surface area: 10.8 m²/g
Hot pressing at 1850° C./25 MPa/dwell time: 1 hour.

C10'

C10 subsequently heated for 40 hours at 1400° C./0.1 MPa N₂.

The sintered articles manufactured in Examples 1 to 10 (E1 to E10 according to the invention) and in Comparison Examples 1 to 10 (C1 to C10) were examined with regard to their properties. The results are listed in the following Table.

In this Table $BS_{RT}$=bending strength at room temperature, measured according to the 4-point method $BS_{1200°\ C.}$=bending strength at 1200° C., measured according to the 4-point method % decrease=decrease in bending strength at 1200° C. in % compared with the value measured at room temperature $n_{RT}$=crack growth resistance parameter n for the slow crack growth and/or for the static fatigue at room temperature $n_{1200°\ C.}$=crack growth resistance parameter n for the slow crack growth and/or for the static fatigue at 1200° C.

E modulus=modulus of elasticity at room temperature.
Note: A larger n indicates a slower decrease in strength with time, that is, the long-term strength is better.

TABLE

| Example No. | $BS_{RT}$ (N/mm²) | $BS_{1200°\ C.}$ (N/mm²) | Decrease % | $n_{RT}$ | $n_{1200°\ C.}$ | E modulus (kN/mm²) |
|---|---|---|---|---|---|---|
| E 1 | 794 | 481 | 39 | >100 | 47 | 277 |
| E 2 | 895 | 626 | 30 | 83 | 56 | 282 |
| E 3 | 690 | 433 | 37 | >100 | 52 | 278 |
| E 4 | 648 | 495 | 24 | >100 | 81 | 269 |
| E 5 | 686 | 425 | 38 | >100 | 89 | 279 |
| E 6 | 720 | 501 | 30 | >100 | 77 | 258 |
| E 7 | 914 | 517 | 43 | >100 | 76 | 293 |
| E 8 | 844 | 639 | 24 | >100 | 76 | 254 |
| E 9 | 863 | 622 | 28 | >100 | 94 | 279 |
| E 10 | 915 | 701 | 23 | >100 | 83 | 278 |
| C 1 | 713 | 413 | 42 | 56 | 26 | 319 |
| C 2 | 693 | 337 | 51 | >100 | 18 | 317 |
| C 3 | 642 | 413 | 36 | >100 | 27 | 322 |
| C 4 | 763 | 352 | 54 | >100 | 22 | 314 |
| C 5 | 649 | 422 | 35 | 74 | 42 | 324 |
| C 6 | 614 | 311 | 49 | 83 | 36 | 317 |
| C 7 | 592 | 307 | 48 | 81 | 31 | 318 |
| C 8 | 659 | 306 | 54 | >100 | 29 | 321 |
| C 9 | 667 | 287 | 57 | 71 | 17 | 320 |
| C 10 | 550 | 197 | 64 | 51 | 9 | 317 |
| C 10' | 485 | 228 | 53 | 48 | 14 | 315 |

In Example 3, 5% akermanite Ca₂Mg(Si₂O₇) or, otherwise expressed, 2CaO.MgO.2SiO₂, was used. In Comparison Example 10, the oxides were added in the same molar ratio as a mixture. Under the same hot-pressing conditions as in Example 3 no akermanite was detected in the end product by means of X-ray crystal analysis. Even after long-term tempering (40 hours at 1400° C.; C10'), no akermanite was detected by X-ray. The properties had, however, changed. In order to measure the values indicated in the Table for C10', however, it was necessary first to remove by grinding a 150 μm thick porous oxidation layer. When this layer was not removed, the BS at room temperature was only 213 Nmm².

We claim:

1. A polycrystalline sintered article consisting essentially of at least 50% by weight of a first crystalline silicon nitride phase of which at least 90% by weight is in the β-form and at least one second crystalline intergranular silicate phase, said intergranular silicate phase essentially formed from at least one preformed crystalline silicate of natural or synthetic origin, with the exception of quartz, having a melting point in the range of 1350° C. to 1950° C., the article having a density of at least 99% of the theoretically possible density, a modulus of elasticity at room temperature of less than 300 $KN/mm^2$, a short-term bending strength at room temperature, measured according to the 4-point method, of at least 600 $N/mm^2$ which, up to 1200° C., decreases by less than 50%, and a long-term bending strength, measured according to the 4-point method, having a numerical value of more than 40 at 1200° C. for the crack growth resistance parameter n.

2. A process for the manufacture of a polycrystalline sintered article of claim 1 which comprises: sintering, a mixture consisting essentially of at least 50% by weight of silicon nitride powder, not more than 49.5% by weight of at least one silicate sintering additive and at least 0.5% by weight of at least one nucleus former, wherein the sintering additive consist essentially of at least one preformed crystalline silicate of natural or synthetic origin with the exception of quartz having a melting point in the range of from 1350° C. to 1950° C. and the nucleus former comprises at least one metal carbide having a melting point of at least 1500° C.

3. A process according to claim 2, wherein the starting material is a homogeneous powder mixture consisting essentially of at least 50% by weight of silicon nitride, of which at least 80% by weight is in the α-form, the silicon nitride containing not more than 4.0% by weight of impurities in the form of oxides and free carbon, and having a specific surface area of from 3 to 15 $m^2/g$ (measured according to BET), at least one crystalline silicate and wherein the at least one carbide nucleus former has an average particle size of <2 μm.

4. A process according to claim 2, wherein the preformed crystalline silicate consists essentially of at least one silicate selected from the group consisting of the neso, soro, cyclo, ino, phyllo and tecto silicates.

5. A process according to claim 2, wherein the metal carbide comprise metal atoms selected from groups 4b, 5b and 6b of the Periodic Table, boron and silicon.

6. A process according to claim 5 wherein the carbide is at least one member selected from the group consisting of TiC, ZrC, WC, TaC, CrC, VC, $B_4C$ and SiC.

7. A process according to claim 6 wherein the carbide is TiC.

8. A process according to claim 2 wherein the sintering is effected by a hot pressing method.

9. A process according to claim 8 wherein the sintering is effected by an isostatic hot pressing method.

10. A process according to claim 2 wherein the sintering is effected by a pressureless sintering method.

11. A process according to claim 10 wherein the sintering is effected at a pressure less than atmospheric pressure.

* * * * *